(12) United States Patent
Fisher et al.

(10) Patent No.: US 6,480,200 B1
(45) Date of Patent: Nov. 12, 2002

(54) METHOD AND APPARATUS FOR DEFERRED TEXTURE VALIDATION ON A MULTI-TASKING COMPUTER

(75) Inventors: Thomas D Fisher, Loveland, CO (US); Courtney Goeltzenleuchter, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 383 days.

(21) Appl. No.: 09/591,439

(22) Filed: Jun. 9, 2000

(51) Int. Cl.$^7$ ................................................ G06T 11/40
(52) U.S. Cl. ........................ 345/582; 345/552; 707/8; 707/100
(58) Field of Search ................. 345/582, 552; 707/8, 9, 100; 717/187

(56) References Cited

U.S. PATENT DOCUMENTS 6,148,438 A  *  11/2000  Schmit ........................... 717/5
6,349,355 B1 *  2/2002  Draves et al. ................. 711/6

* cited by examiner

*Primary Examiner*—Matthew Luu
(74) *Attorney, Agent, or Firm*—T. Grant Ritz

(57) ABSTRACT

A method of avoiding processor state transitions while rendering frames includes forming a command data buffer and a data structure in response to drawing commands received from a graphics application. The command data buffer includes a list of primitives. The data structure identifies a texture and where in the command data buffer (offset) the texture should be referenced. Multiple texture changes can be accumulated at user level before making a ring transition to kernel mode to process the command data buffer. After the command data buffer and data structure are formed, kernel mode is entered so that a graphics driver can communicate the command data buffer to graphics hardware. While in kernel mode offsets stored in the data structure cause the driver to verify that the texture is present in graphics memory. If not present, the driver causes the texture to be loaded before continuing to communicate the primitives. Thus, multiple textures can be loaded the kernel session.

4 Claims, 6 Drawing Sheets

METHOD AND APPARATUS FOR DEFERRED TEXTURE VALIDATION ON A MULTI-TASKING COMPUTER

BACKGROUND OF THE INVENTION

1. Field of the Invention

This invention relates generally to applying texture maps, and more particularly, to a method and apparatus for avoiding processor state transitions while rendering frames.

2. Description of Related Art

Computer graphics systems are commonly used for displaying two-and three-dimensional graphics representations of objects on a two-dimensional video display screen. Current computer graphics systems provide highly detailed representations and are used in a variety of applications, such as computer-aided design, animation and the like.

In a typical computer graphics system, an object or model to be represented on the display screen is broken down into graphics primitives. Primitives are basic components of a graphics display and may include, for example, points, lines, triangles, quadrilaterals, triangle strips and polygons. Typically, a hardware/software scheme is implemented to render, or draw, the graphics primitives that represent a view of one or more objects being represented on the display screen.

Generally, the primitives of a three-dimensional object to be rendered are defined by a host computer in terms of primitive data. For example, when the primitive is a triangle, the host computer may define the primitives in terms of the X, Y, Z and W coordinates of its vertices, as well as the red, green, blue and alpha (R, G, B and alpha.) color values of each vertex. Additional primitive data, such as texture mapping data, may be used in some applications. Rendering hardware interpolates the primitive data to compute the display screen pixels that represent each primitive, and the R, G and B color values for each pixel.

Early graphics systems failed to display images in a sufficiently realistic manner to represent or model complex three-dimensional objects. The images displayed by such systems exhibited extremely smooth surfaces absent textures, bumps, scratches, shadows and other surface details present in the object being modeled.

As a result, methods were developed to display images with improved surface detail. Texture mapping is one such method to improve surface detail that involves mapping a source image, referred to as a texture, onto a surface of a three-dimensional object, and thereafter mapping the textured three-dimensional object to the two-dimensional graphics display screen to display the resulting image. Surface detail attributes commonly texture mapped include color, specular reflection, vector perturbation, specularity, transparency, shadows, surface irregularities and grading. Texture mapping involves applying one or more point elements (texels) of a texture to each point element (pixel) of the displayed portion of the object to which the texture is being mapped. Texture mapping hardware subsystems typically include a local memory cache that stores texture mapping data associated with the portion of the object being rendered.

The basic components of a computer graphics system typically include a host computer and graphics hardware. The host computer may include a graphics application, a graphics application programming interface and a graphics driver. The graphics application programming interface (API) receives commands from a user through the graphics application program and provides primitive data, in conjunction with the graphics driver, to the graphics hardware. The graphics hardware typically includes a geometry accelerator, a rasterizer and a frame buffer, and may include texture mapping hardware. The geometry accelerator receives primitive data from the host computer and performs operations such as coordinate transformations and lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware are combined and stored in the frame buffer for display on a display output device such as a monitor, TV or flat panel display.

The applications in the host computer frequently utilizes the OpenGL application programming interface standard. (OpenGL is a registered trademark of Silicon Graphics, Inc.). The OpenGL standard is a hardware independent interface designed to be implemented on different hardware platforms that provides a complete library of low level graphics manipulation commands for describing models of three-dimensional objects. This standard was originally based on the proprietary standards of Silicon Graphics, Inc., but was later transformed into an open standard, which is used in high end graphics-intensive workstations and, more recently, in high end personal computers. OpenGL is supported on a wide range of hardware platforms and software environments such as, Mac® OS, OS/2®, UNIX, Solaris, Windows 95/98, Windows NT, Linux, OPENStep, Python, and BeOS. The OpenGL standard is described in the OpenGL Programming Guide, Version 1.2 (1999) and the OpenGL Reference Manual, Version 1.1 (1997).

Applications that use texture mapping typically communicate texture map data prior to the start of rendering an image. This is done through glTexImage commands that are issued to the API. To render the image OpenGL commands are passed to the API that specify primitive data and what texture data, if any, is associated with the primitives. Texture map data is associated with a primitive or primitive using the glBindTexture command. A glBindTexture command specifies which texture will be applied to all subsequent primitives until a new texture is specified or texturing is disabled. Typically, the graphics driver processes the OpenGL commands to form a command/data buffer of low level commands according to the graphics hardware implementation. The graphics hardware reads the command/data buffer to render the image.

Before a primitive is rendered, the texture map must be resident on the graphics hardware. Because texture memory is finite, it is possible for the total amount of texture space needed by a graphics application (or multiple applications running simultaneously) to exceed the capacity of the texture memory. This may cause the graphics driver to load and unload textures to ensure that the desired texture is available in texture memory when needed. Thus, if the texture map is not resident in the graphics hardware when the command/data buffer is constructed, the graphics driver will cause the texture map to be loaded into the hardware. This is done by placing the texture data in a separate command/data buffer. The command/data buffer is loaded into the hardware by programming a direct memory access (DMA) engine with the address of the command/data buffer, and the destination address in the graphics hardware.

In Windows NT, all hardware device accesses must occur in privileged mode (or kernel mode). Since the graphics application is running in user mode, a ring transition from user mode to kernel mode is required every time a texture map is loaded. Once processing of the command data buffer has begun by the graphics hardware, the graphics driver returns from kernel mode to user mode to allow the graphics application to continue issuing commands. Depending on the textures loaded and the amount of texture memory, a ring transition is potentially required for every command data buffer. A Windows NT system creates an additional complexity by allowing multiple OpenGL applications to be active simultaneously. The necessity of ring transitions between user and kernal modes are relatively time consuming and reduce system bandwidth. Accordingly, a more efficient method of switching textures is desired.

SUMMARY OF THE INVENTION

According to a preferred embodiment, the invention provides a method for rendering textures in a graphics controller. The invention may be broadly conceptualized by the following steps: receiving draw commands from an application; forming a command data buffer responsive to the draw commands containing primitives corresponding to each draw command received from the application; forming a data structure responsive to the draw commands identifying a texture to be applied to the primitives; switching from user mode to kernel mode after forming the command data buffer and the data structure; in kernel mode, loading into the graphics controller a first texture identified in the data structure if the first texture is not present in the graphics controller; and in kernel mode, sending the primitives corresponding to the first texture to the graphics controller. The loading and sending steps may be repeated for each texture identified in the data structure.

Other features and advantages of the invention will become apparent to one of ordinary skill in the art upon examination of the following detailed description of illustrative embodiments in conjunction with the accompanying drawings. It is intended that all such features and advantages be included herein within the scope of the invention and protected by the claims.

BRIEF DESCRIPTION OF THE DRAWINGS

The foregoing and other aspects, features, and advantages of the present invention will become apparent from the following detailed description, which taken in conjunction with the accompanying drawings illustrate by way of example the principles of the invention.

DETAILED DESCRIPTION

Figure 1:
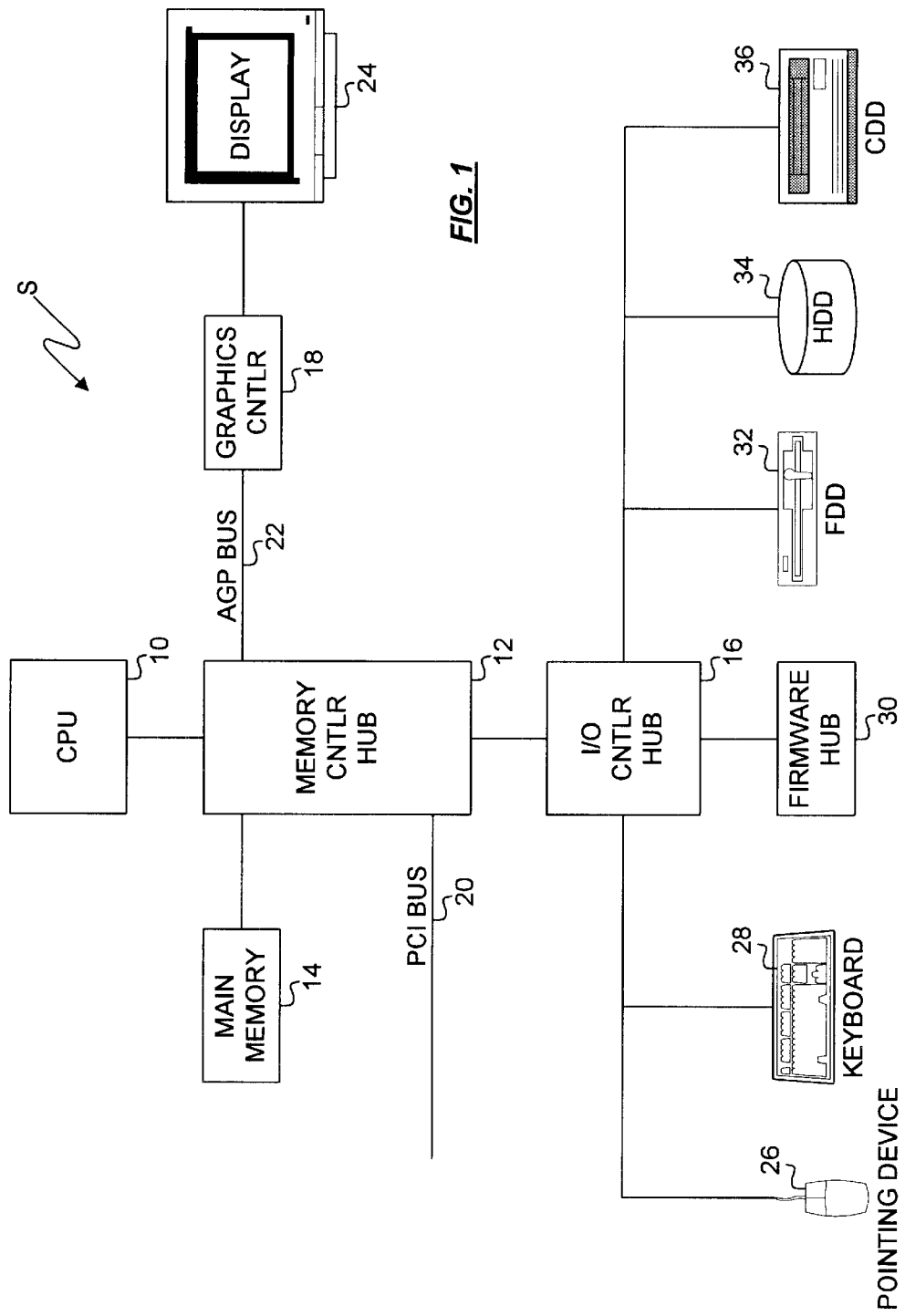
FIG. 1 is a block diagram illustrating a computer system S according to a preferred embodiment.

As shown in the drawings for purposes of illustration, the invention is embodied in a computer system S that includes a graphics controller for efficiently downloading texture maps into a frame buffer. The graphics controller is beneficially operable to process multiple texture commands without switching between user and privileged modes in a multi-tasking computer.

Referring first to FIG. 1, there is illustrated a computer system S according to a preferred embodiment. A central processing unit (CPU) 10 is coupled to a memory controller hub 12. The memory controller hub 12 is further coupled to a main memory 14, an input/output controller hub 16, and a graphics controller 18. The memory controller hub 12 also provides an interface to a peripheral component interface (PCI) bus 20. The graphics controller 18 is connected to the memory controller hub 12 by an accelerated graphics port (AGP), or AGP bus 22. Output of the graphics controller 18 is provided to a display output device 24 for displaying 2D and 3D graphics, text and video.

The input/output controller hub 16, is further connected to a pointing device 26, keyboard 28, firmware hub 30, floppy disk drive (FDD) 32, hard disk drive (HDD) 34, and compact disk drive (CDD) 36.

In the operation of the computer system S, a graphics application is executed on the CPU 10. The graphics application receives input from interaction devices such as the pointing device 26 or keyboard 28, and generates images for output on the display output device 24. The graphics controller 18 receives a series of graphics output commands from the application to develop the images that contain both a geometric description of what is to be displayed and the attributes describing how the objects should appear.

Figure 2:
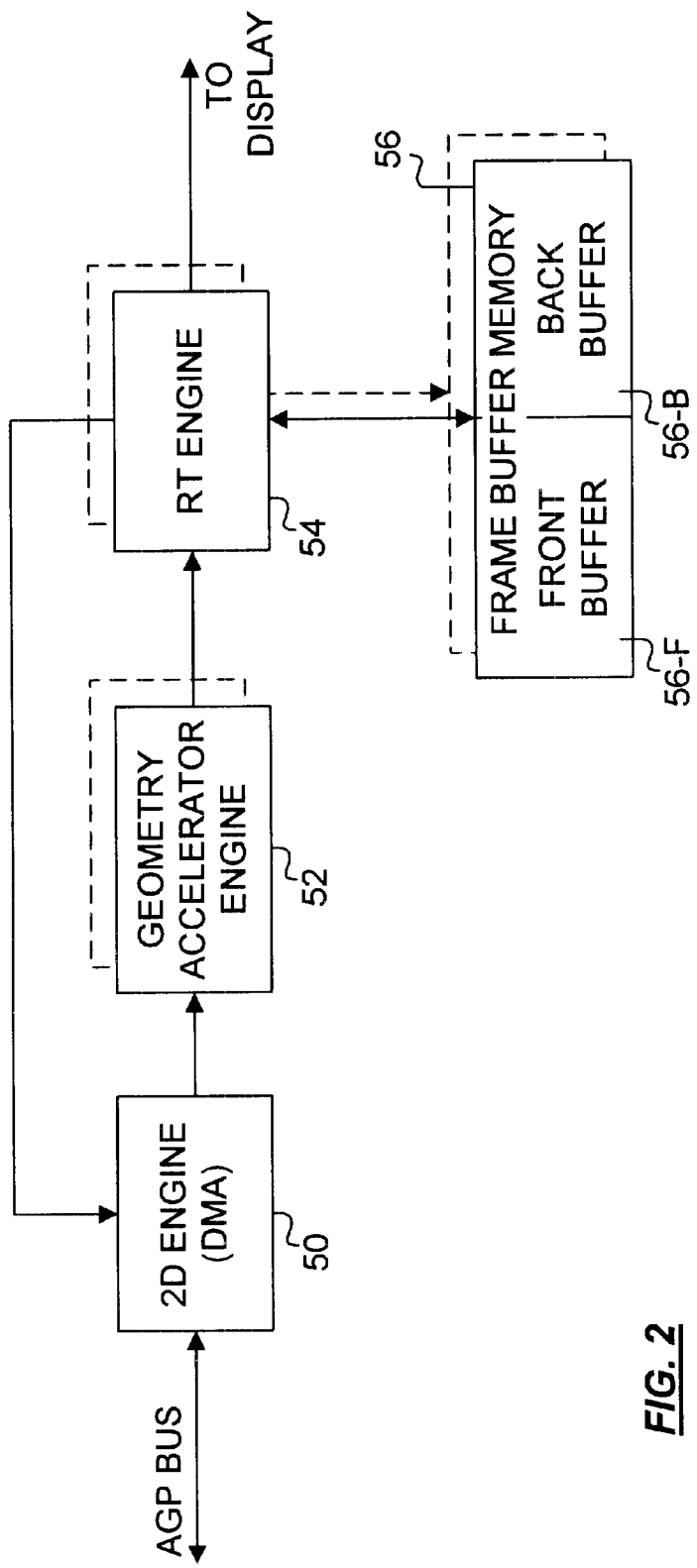
FIG. 2 is a block diagram illustrating the graphics controller of FIG. 1, according to a preferred embodiment.

Referring next to FIG. 2, there is illustrated a high-level block diagram of the graphics controller 18 showing a graphics pipeline. Data is received by the graphics controller 18 from the CPU 10 over the AGP bus 22 into a two-dimensional (2D) engine 50 for handling 2D functions such as drawing primitives (points, lines, curves, circles, polygons, etc.) filling primitives, clipping primitives, and generating characters. The 2D engine 50 also includes a direct memory access (DMA) engine to quickly transfer data between main memory 14 and various buffers of the graphics controller 18, particularly a first-in first-out (FIFO) memory for receiving commands and data. Next in the graphics pipeline is one or more geometry accelerator engines 52 that receive commands and data from the CPU 10, via the 2D engine 50, for performing 3D geometrical transformations, such as translation, scaling, and rotation. In a preferred embodiment, up to six geometry accelerator engines 52 are used although other variations may use more than six for enhanced performance. Data from the 2D engine 50 and geometry accelerator engine 52 is provided to one or more rasterizer/texture (RT) engines 54 for performing rasterization, texture mapping and display scanning on rendered images which are stored in a frame buffer memory 56. In a preferred embodiment, one RT engine is used although other variations may use more than one for enhanced performance.

Figure 3:
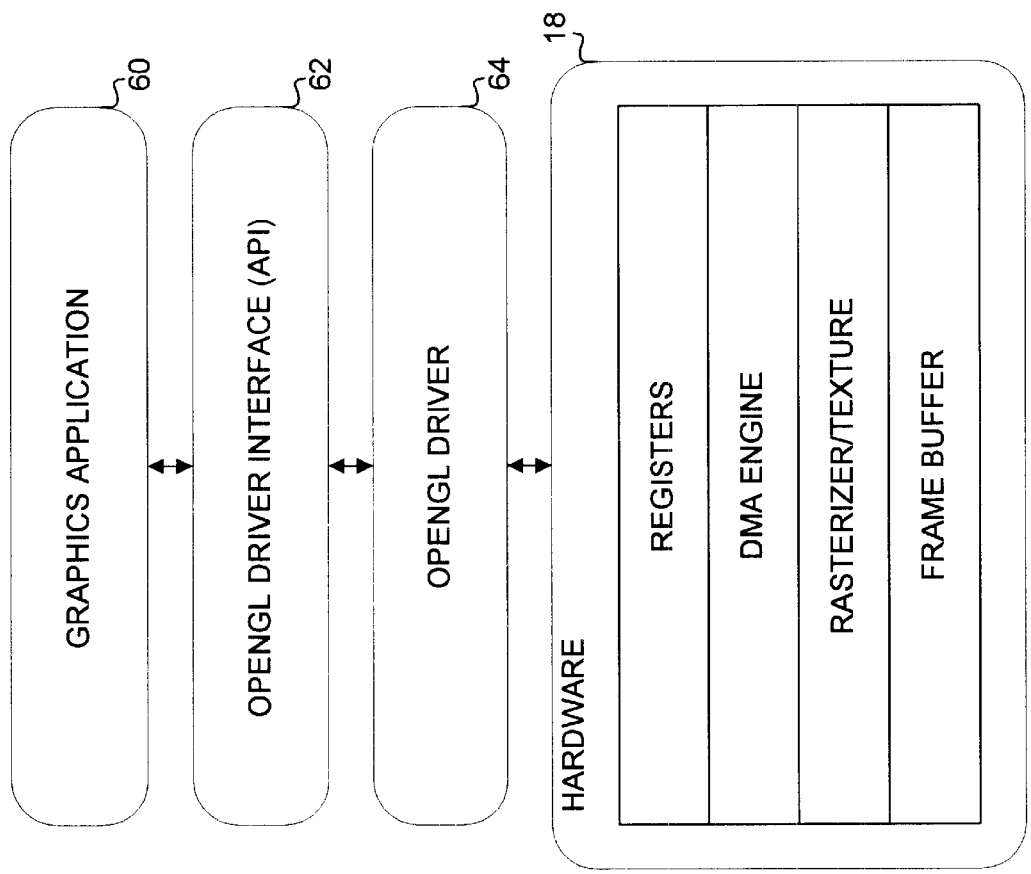
FIG. 3 is an block diagram illustrating a software architecture according to a preferred embodiment.

Now referring to FIG. 3, there is illustrated a block diagram showing a software/hardware architecture according to a preferred embodiment. In the operation of the computer system S, one or more graphics applications 60 are executed on the CPU 10 in user mode. Generally, a graphics application 60 receives input from interaction devices such as the pointing device 26 or keyboard 28, and generates images for output on the display output device 24. Each graphics application 60 communicates with an OpenGL driver interface 62 to pass graphics commands to the graphics driver. Each command is received by an OpenGL driver 64, which converts the command into low-level hardware commands which are [read] sent to the graphics controller 18 in kernel mode. In certain operating systems such as Windows NT, kernel mode allows the driver 64 access privileges to communicate directly with hardware whereas user mode does not.

In a preferred embodiment, texture maps are transferred to the graphics controller 18 with a DMA operation, although other data transfer techniques could be used. This requires the OpenGL driver 64 to communicate directly with hardware in kernel mode to initialize the DMA engine of the 2D engine 50. Since textures must be present in order to be applied during the execution of the texture commands, ring transitions into kernel mode to download textures is quite common.

Figure 4:
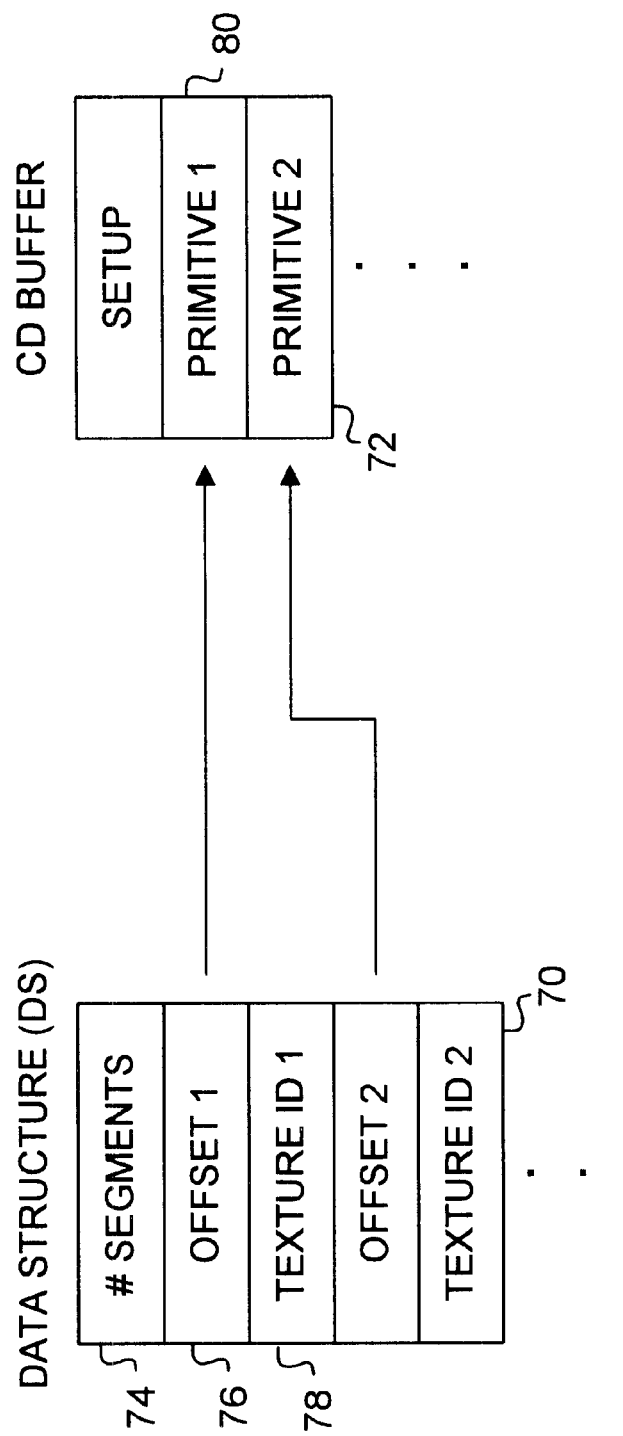
FIG. 4 is a conceptual diagram illustrating a data structure and a command data buffer according to a preferred embodiment.

Reference is directed to FIG. 4. In a preferred embodiment, the OpenGL driver 64 forms a data structure 70 and a command data (CD) buffer 72 in main memory 14 from the commands received from the graphics application 60. The data structure 70 and CD buffer specify the series of primitives. As the CD buffer 72 is developed in user mode, a texture ID 78 is placed in the data structure along with an offset 76 of the location in the CD buffer where the texture reference is needed. The data structure also contains an indicator 74 of how many texture operations will be performed. Essentially, the texture ID 78 is included as a placeholder for a texture map that may not yet have been loaded. Thus, the data structure 70 includes fields helpful in interpreting the CD buffer 72. The advantage of this technique is that the driver can build a CD buffer 72 without having the texture map pre-loaded. As a result, the OpenGL driver 64 can reference multiple textures while processing a single CD buffer (containing multiple draw operations).

Figure 5A:
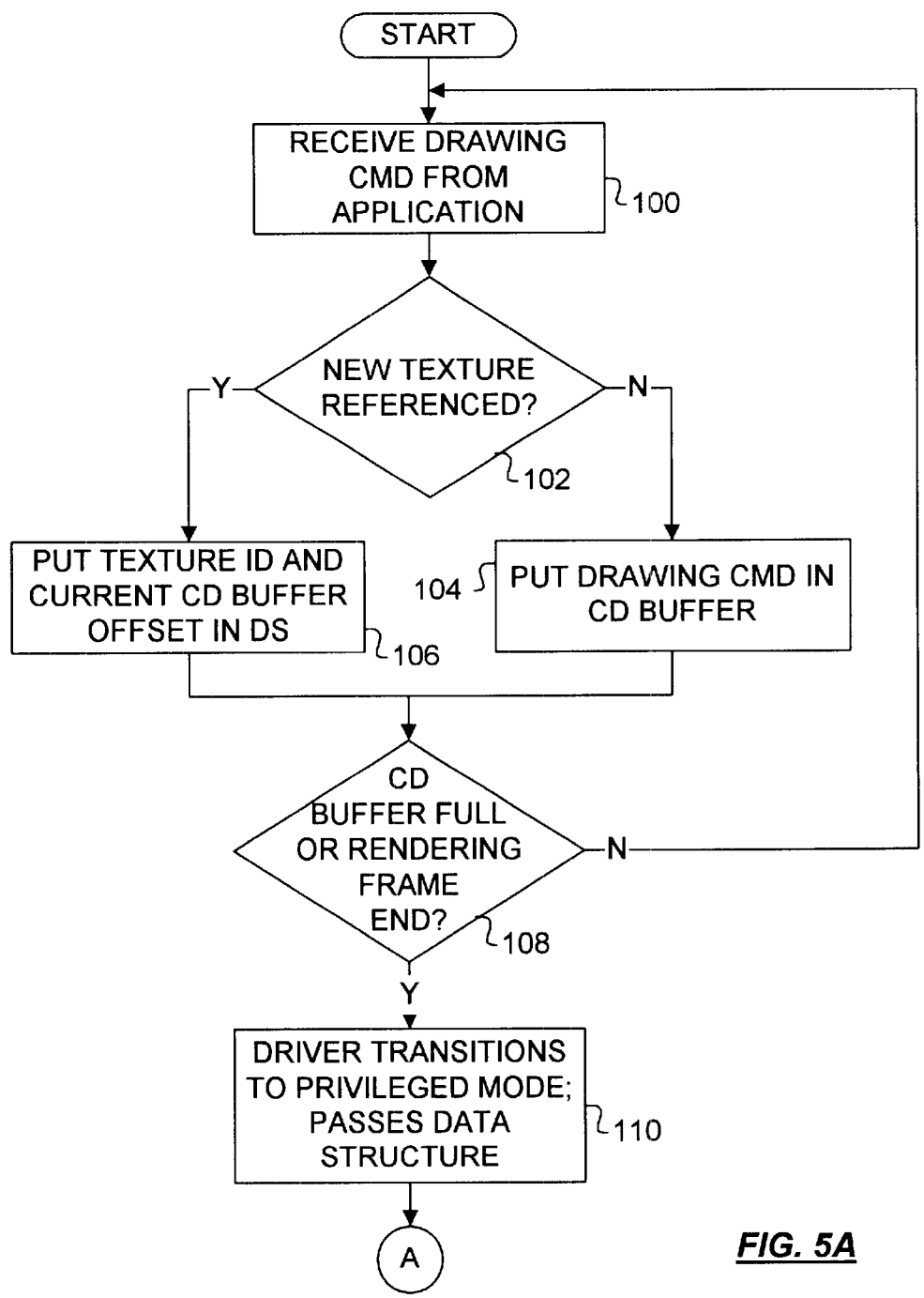
FIGS. 5A and 5B are flow diagrams illustrating a method of avoiding processor state transitions while rendering frames, according to a preferred embodiment.
Figure 5B:
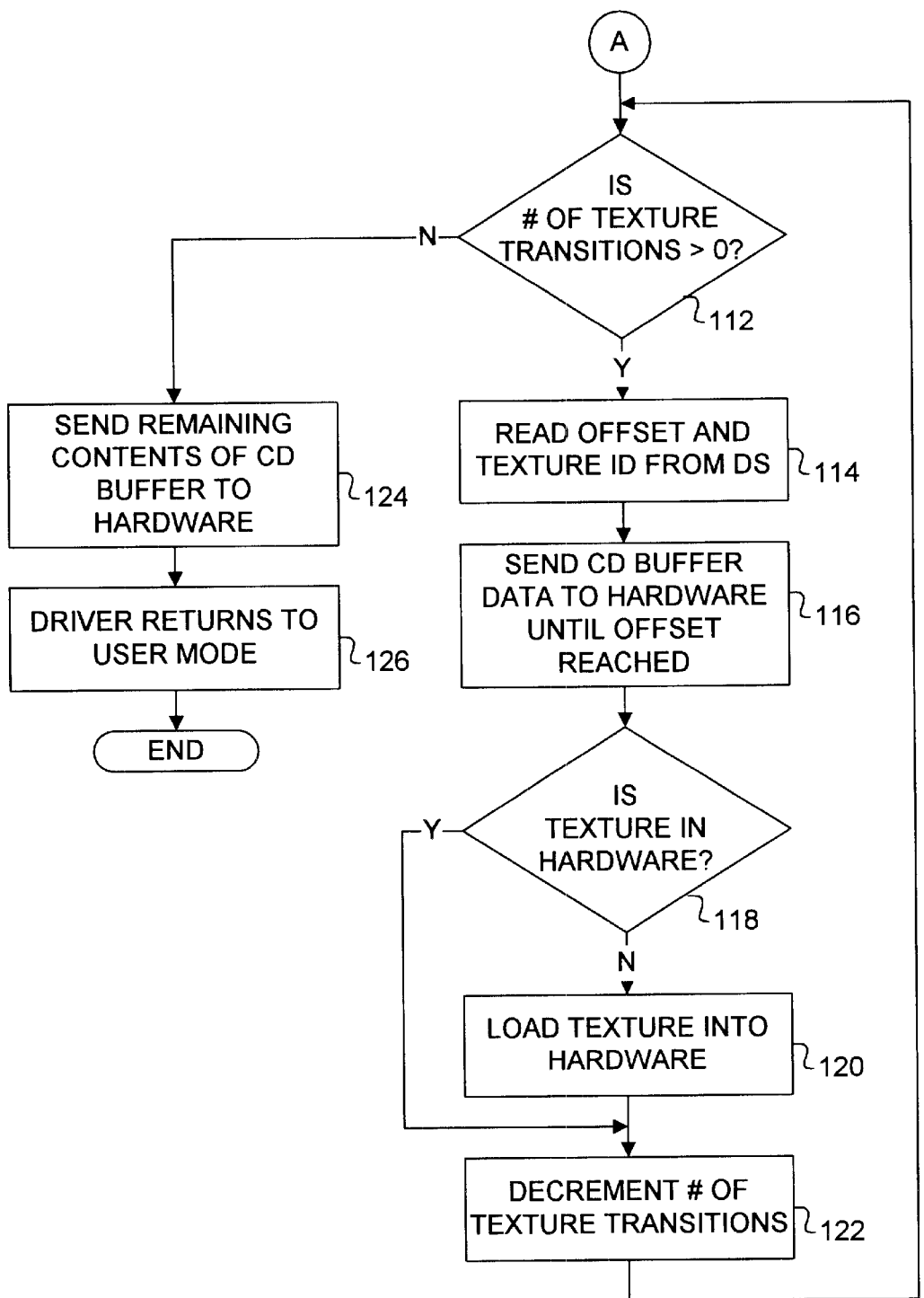

Reference is now directed to FIGS. 5A and 5B where there is illustrated a flow diagram showing a method of avoiding processor ring transitions performed by the OpenGL driver 64 while rendering frames. In the prior art, when the active texture is changed this would force the OpenGL driver 64 to perform a ring transition to process the commands currently contained in the CD buffer 72. This is because certain operating systems like Windows NT only allow hardware access in kernel mode. Thus, given these constraints the OpenGL driver 64 would ordinarily transition to kernel mode to check whether the active texture has already been loaded. The present invention allows multiple texture changes to be accumulated at user level before making the ring transition to kernel mode to process the CD buffer 72. This amoratizes the cost of ring transition changes over several texture changes thereby improving performance of the graphics system.

A graphics application develops drawing commands which are received by the OpenGL driver 64 via the OpenGL API 62. At a step 100, the driver 64 begins to parse the commands to form a CD buffer 72. Registers in the RT engine 54 are initialized in accordance with the texture draw operation when the CD buffer 72 is first read. At step 102, the driver 64 determines whether a first command references a new texture map. If a new texture map is not referenced (meaning the command does not require a texture or the texture is currently the texture being referenced) the drawing command is written to the CD buffer 72 at step 104. If a new texture is referenced, the current offset in the CD buffer 72 is written to the data structure 70 along with a texture ID at step 106. The texture ID identifies the texture to be applied to the primitive 80 referenced by the offset.

Processing from steps 104 and 106 proceeds to step 108 where the OpenGL driver 64 determines whether the CD buffer 72 is full or whether the received commands from the graphics application 60 have been exhausted. In a preferred embodiment, the CD buffer 72 is artificially limited to thirty-two texture draw commands 74, but more or less than thirty-two could be used without departing from the principles of the invention. If the result is negative, processing branches from step 108 back to step 100 to receive another command from the graphics application 60. If the result is positive, the OpenGL driver 64 transitions from user mode to kernel mode and passes the data structure as an argument.

At step 112, the OpenGL driver 64 reads the segment field 74 of the data structure 70 to determine the number of texture transitions. If the number is greater than zero, processing branches to step 114 where the driver reads the first offset 76 and texture ID 78 from the data structure 70. Next at step 116, the driver 64 causes the contents of the CD buffer 72 to be sent to the RT engine 54 until the offset is reached. If the first offset is zero, then no data is sent the first time step 116 is performed since the texture should be resident in memory before any commands are sent to the RT engine 54. At step 118, the driver 64 determines whether the texture referenced at step 114 is already present in the frame buffer 56. If so, processing branches to step 122. If not true, then at step 120 the driver 64 causes a DMA operation to load the texture into frame buffer 56. At step 122, the number of texture transitions contained in segment field 74 is decremented and processing branches back to step 112 where the process is repeated for another texture.

If at step 112, it is determined that no further texture transitions are contained in the CD buffer 72, processing branches to step 124 where the remaining contents of the CD buffer 72 are sent to hardware. The remaining contents could be primitives corresponding to the last loaded texture, or draw command not requiring a texture. At step 126, the driver 64 causes a ring transition to return to user mode to continue processing more commands from the graphics application 60.

Therefore, it can be seen from the foregoing that the invention provides a method of avoiding processor state transitions while rendering frames. Although several embodiments of the invention have been described and illustrated, the invention is not to be limited to the specific forms or arrangements of the parts so described and illustrated. Thus, having illustrated and described the principles of the invention in a preferred embodiment, it should be apparent to those of ordinary skill in the art that the invention can be modified in arrangement and detail without departing from such principles.

What is claimed is:

1. A method of rendering textures in a graphics controller, comprising:

receiving draw commands from an application;

forming a command data buffer responsive to the draw commands containing primitives corresponding to each draw command received from the application;

forming a data structure responsive to the draw commands identifying a texture to be applied to the primitives;

switching from user mode to kernel mode after forming the command data buffer and the data structure;

in kernel mode, loading into the graphics controller a first texture identified in the data structure if the first texture is not present in the graphics controller; and in kernel mode, sending the primitives corresponding to the first texture to the graphics controller.

2. The method of claim 1, further comprising:

repeating the loading and sending steps for each texture identified in the data structure.

3. The method of claim 1, further comprising:

switching from kernel mode to user mode after processing the command data buffer.

4. A method of rendering textures in a graphics controller, comprising:

(a) storing draw commands in a command data buffer;

(b) storing a texture ID and an offset in a data structure if a new texture is referenced while storing draw commands in the command data buffer;

(c) switching from user mode to kernel mode;

(d) in kernel mode, sending the draw commands to the graphics controller until an offset in the data structure is reached;

(e) in kernel mode, loading into the graphics controller a texture identified in the data structure if the texture is not present in the graphics controller;

(f) in kernel mode, sending the draw commands to the graphics controller from the offset until a next offset in the data structure is reached;

(g) in kernel mode, repeating steps (e) and (f) until the command data buffer is exhausted; and (h) switching from kernel mode to user mode.

\* \* \* \* \*